યુ

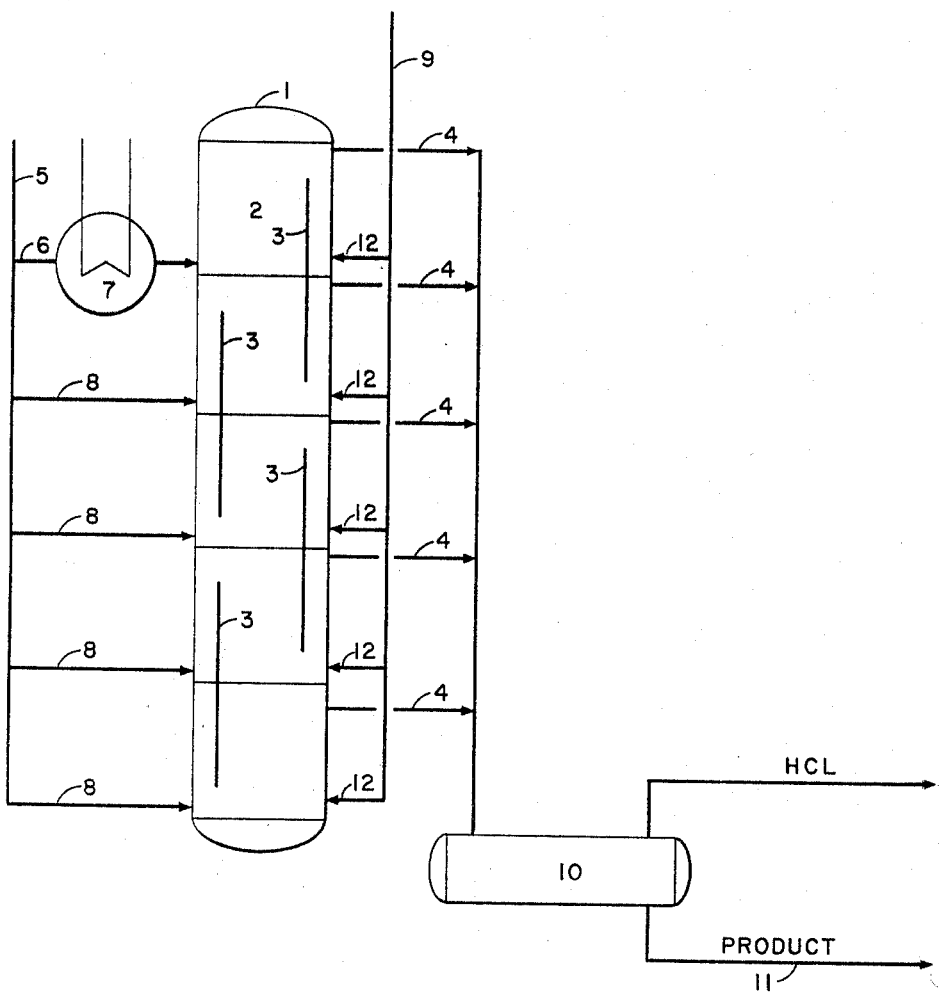

United States Patent Office 3,431,314
Patented Mar. 4, 1969

3,431,314
PROCESS FOR CHLORINATING HYDROCARBONS
Eugene C. Olinger, William R. Bradley, and John H. Smith, Ponca City, Okla., assignors to Continental Oil Company, Ponca City, Okla., a corporation of Delaware
Filed Jan. 21, 1965, Ser. No. 426,912
U.S. Cl. 260—660    7 Claims
Int. Cl. C07c 17/10, 19/02

This invention relates to a method for chlorinating hydrocarbons and particularly pertains to a continuous method for effecting the partial chlorination of normally liquid paraffins by thermally reacting from about 0.15 to 0.40 mole of chlorine per mole of the paraffin. More specifically, the present invention relates to an improved continuous process for substantially monochlorinating paraffins wherein from about 40 to 80% of the total paraffin feed to the process is progressively contacted in the liquid phase in separate stages with portions of the total chlorine feed and wherein the remainder of the paraffin feed is parallelly introduced to the chlorination stage or stages subsequent to the first of such stages at a quench-reducing temperature capable of maintaining a low temperature profile throughout the chlorination reaction.

There are a number of chemical synthesis operations calling for the use of monochloro hydrocarbons as an intermediate. Several ways exist for obtaining these monochloro derivatives. For economic reasons, however, the only method that can be employed in most large-scale commercial practices involves directly reacting the hydrocarbon with elemental chlorine. This invention is particularly concerned with such a method for obtaining monochloro paraffins. In still narrower aspects, the instant invention is concerned with a direct chlorination method for producing a partially chlorinated n-paraffin product beneficially suited as an intermediate for the preparation of detergent alkylates, e.g., n-alkyl benzenes. As is known, the water-soluble sulfonate salts of the latter are biologically soft surfactants having excellent detersive properties.

It has been indicated above that in the chlorination process to which this invention is directed, the paraffins employed in the preferred embodiment exist in a liquid state. The chlorine, however, is present for the most part in the gaseous state; and, consequently, the contemplated reaction system is essentially a 2-phase system. In such a system for effecting thermal chlorination, a serious problem is encountered. The problem resides in the fact that under the elevated temperature conditions employed there is a tendency for the paraffin to react with chlorine to form principally carbon and hydrogen chloride, which reaction is termed chlorinolysis. Chlorinolysis is a highly exothermic reaction and, consequently, this side reaction is prone to become uncontrollable thereby resulting in extensive fires. The chlorinolysis side reaction is to be completely avoided since even if this reaction occurs to only a limited extent, there will nevertheless be an uneconomical consumption of chlorine and paraffins. Furthermore, this reaction tends to degrade certain physical properties of the chlorinated product. Accordingly, the foremost advantage of the process of this invention is that thermal chlorination can be carried out in a 2-phase system whereby no chlorinolysis is experienced.

In the preparation of chlorinated paraffins for use in the production of detergent alkylates, or for that matter in the utilization of such a product in many other applications, it is desirable to produce only monochloro derivatives. The direct chlorination method, however, is inherently limited in this regard as it does not result in the exclusive formation of monochloro paraffins. Invariably, a small amount of polychlorinated derivatives is also produced along with the desired monochloro alkanes. In evaluating the efficiency of a direct chlorination technique, the concept of selectivity is used. Selectivity in this instance refers to the molar amount of monochloro paraffins produced per mole of paraffin consumed during the chlorination reaction. As indicated, it is not possible by means of direct chlorination to obtain a selectivity of one. For each level of chlorination, i.e., moles of chlorine reacted/moles of paraffin present in the reaction mixture, only one theoretical maximum selectivity figure obtains. As will be discussed more in detail later, the process of this invention can be adapted to readily provide near theoretical maxima of selectivities of monochloro derivatives in thermally chlorinating detergent range n-paraffins, i.e., $C_8$–$C_{20}$ alkanes, in liquid phase over a range of chlorination levels.

In accordance with the process of this invention, from about 40 to 80% of the total paraffin feed to the system is introduced continuously into a reaction sphere comprised of a plurality of communicating reaction stages or zones whereby this portion of the feed will undergo series flow throughout all of the various reaction zones. The paraffin feed to the first of the reaction zones is at an elevated temperature capable of inducing reaction with chlorine upon contact therewith. Suitable temperatures for thermally inducing the chlorination reaction vary from about 210 to 320° F. A more preferable range is from about 230 to 260° F. The requisite chlorine gas feed is introduced continuously into each of the reaction zones. The rate of chlorine introduction to the various reaction zones need not be the same for each zone; however, equal rate injection of this reactant is preferred.

Further, in accordance with our process, the remainder of the paraffin feed to the system is injected into each reaction zone subsequent to the first zone. The paraffin feeds employed in this manner serve to check the heat of reaction generated in the previous reaction zones. The quench paraffin feed is introduced at a rate and temperature jointly capable of substantially offsetting the temperature rise occurring in the previous reaction zone. In the operation of a system having in evcess of two reaction zones, it is preferred to inject the quench paraffin at about equal rates. The preferred temperature for the quench paraffin is ambient or less. As is obvious, however, higher temperatures than ambient can be used.

The various rates of paraffin feed to the system with respect to the total rate of chlorine introduction are regulated so as to provide an overall external molar ratio of chlorine to paraffin of from about 0.15 to 0.40. For the purpose of preparing partially chlorinated products which are particularly useful in the production of biologically soft surfactants, the external molar ratio of chlorine to paraffin is preferably between about 0.2 and 0.3.

The foregoing generally describes the chlorination process constituting our invention. In order to obviate chlorinolysis and to achieve acceptable selectivities to monochloro derivatives, it is required to employ a reaction system consisting of at least two zones or stages. To obtain further improvements in selectivity, it is desirable to utilize a system of more than two stages especially when operating within the preferred range of reactant ratios. There obviously is no upper limit to the number of stages that can be used. However, there is only a very little advantage to be gained by employing more than ten stages. As a matter of fact, a 6-stage system represents about the optimum limit from an economical operating standpoint. When employing a system having from 2–6 stages, the amount of the paraffin feed to the first stage can be from about 40 to 80% of the total paraffin feed to the system. The balance of the paraffin feed is parallelly introduced at ambient temperature or less into each stage subsequent to the first. The respective ratio of the paraffin so introduced can be varied. The only requirement is that such feeds be in an amount sufficient to effectively quench the temperature rise occurring in the previous stage.

In connection with the foregoing discussion, it is to be appreciated that various stages comprising the reaction sphere need not take the form of an integral unit. For example, a series of stirred pots represents an adequate equipment arrangement for carrying out the process of our invention. Of course, a commercial adaptation of the process can be best carried out in an integral equipment unit and such a device will be discussed next in outlining a preferred embodiment of the invention. To facilitate an understanding of this embodiment, reference will be had to the accompanying drawing in which a suitable chlorinator is shown schematically.

In the drawing there is shown a vertically disposed elongated cylindrical reactor 1 representing the chlorinator unit of the instantly described embodiment. Reactor 1 housing can acceptably be fabricated from standard steel tubing. Chlorine in reaction systems of the type under consideration is somewhat corrosive and additionally forms objectionable product contaminating complexes upon contact with ferrous materials. Accordingly, the interior of the chlorinating unit should be corrosive proof. To obviate corrosion, a glass lining within the metallic chlorinator can be advantageously utilized. Resistant metallic coatings such as nickle, Hastalloy tantalum and the like are likewise satisfactory.

Chlorinator 1 is divided into five reaction zones identified as 2 in the drawing. The length of each zone can acceptably be from about 5 to 10 feet. Each reaction zone 2 is suitably fitted with down flow pipes 3 capable of providing communication between any two adjacent zones. The length of the down flow pipe 3 extending upwardly in any one of the reaction zones is such as to maintain a relatively high holdup of liquid within the zone. A satisfactory alternate to the use of the down flow pipe provisions illustrated is to externally cascade the efflux from one zone to the other. This manner of operation facilitates the application of additional cooling if desired.

Each of the reaction zones 2 is provided with suitable means for venting the hydrogen chloride generated therein. In the drawing such means is schematically illustrated by lines 4. The paraffin feed to the chlorinator enters through line 5 and a major portion thereof progresses through line 6 into the topmost reaction zone 2. As mentioned hereinabove, the amount of paraffin introduced through line 6 is preferably between about 40 and 80% of the total amount of paraffin feed to the chlorinator for such units having from 2–6 stages. A particularly preferred amount of feed introduced through line 6 for the chlorinator shown is about 70% of the total paraffin feed. The paraffin feed entering the chlorinator through line 6 is preheated substantially immediately prior to its introduction in the chlorinator by the heater shown schematically at 7. The balance of the paraffin feed to the chlorinator is parallelly fed through lines 8 in approximately an equal amount to each of the reaction zones existing below the topmost zone. The quench paraffin feeds introduced through lines 8 are preferably at ambient room temperature and when introduced at such temperature in the amounts indicated will hold the reaction temperature to approximately a 20° F. differential from the initial inlet to product outlet.

The chlorine gas is fed into manifold 9 from whence it is distributed in approximately equal amounts to each of the reaction zones 2 through injection lines 12. The entrance velocity of the chlorine feed from injection lines 12 should be at a relatively high rate, e.g., from about 100–400 f.p.s. The superficial velocity of the chlorine gas is initially maintained sufficiently high enough to insure good mixing of the reactants but preferably not in excess of about one foot per second. Suitable superficial gas velocities for this purpose range from about 0.15 to 0.20 f.p.s. in the embodiment herein considered. The partially chlorinated product is withdrawn from the bottom reaction zone and then conveyed to separator 10 from whence it is subsequently withdrawn through line 11.

For the purpose of further illustrating the manner in which the present invention can be carried out, there is tabulated below the pertinent operational conditions for a unit capable of producing about two million pounds per day of a chlorinated product suitable for the preparation of detergent alkylate. A 5-stage chlorinator having a length of 50 feet, ID of 2½ feet and otherwise closely corresponding to the design schematically shown in the accompanying drawing was employed. The liquid depth in each stage was 90 inches. The hydrocarbon feed to the system was a mixture of $C_{10}$–$C_{13}$ n-paraffins.

Stage No. 1 (topmost):
Rate of paraffin feed, lb./hr. _____ 51,000
Temp. of paraffin feed, °/F. _____ 260
Rate of chlorine feed, lb./hr. _____ 1,400
Tip velocity of chlorine feed, ft./sec. _____ 500
Superficial velocity of chlorine feed, ft./sec. _ 0.26
Ave. temp. within stage, °/F. _____ 272

|  | Stage | | | |
| --- | --- | --- | --- | --- |
|  | No. 2 | No. 3 | No. 4 | No. 5 |
| Rate of quench paraffin feed, lb./hr. | 5,500 | 5,500 | 5,500 | 5,500 |
| Temp. of quench paraffin feed, ° F. | 105 | 105 | 105 | 105 |
| Rate of chlorine feed, lb./hr. | 1,400 | 1,400 | 1,400 | 1,400 |
| Tip vel. of $Cl_2$ feed, ft./sec. | 500 | 500 | 500 | 500 |
| Superficial vel. of $Cl_2$ feed, ft./sec. | 0.26 | 0.26 | 0.26 | 0.26 |
| Ave. temp. within stage, ° F. | 276 | 280 | 294 | 288 |

In the operation of a 5-stage chlorinator described above, chlorinolysis does not occur to any ascertainable degree. The selectivity to monochloro paraffin formation for this system, when employing an external molar ratio of chlorine to paraffin of 0.2 as shown, is in the order of about 0.88. The maximum theoretical selectivity for this level of chlorination is 0.9. By comparison, paraffins chlorinated to a 20 mole percent level in a single batch operation results in a selectivity of approximately 0.83.

We have provided above a complete description of a specific embodiment of this process for the purpose of illustrating the best mode contemplated for carrying out our invention. Obviously many modifications and variations of the invention can be devised by those skilled in the art without departing from the spirit and scope thereof. Accordingly, only such limitations should be imposed as are indicated in the appended claims.

We claim:

1. A continuous method for chlorinating a detergent range paraffin or mixture thereof which comprises:
   continuously introducing said paraffin to a vertically disposed reactor divided into a plurality of superimposed communicating reaction zones each of which has a provision for effecting a high liquid holdup whereby from about 40 to 80% of the total paraffin feed at a temperature of between about 210 and 320° F. is introduced into the topmost zone with the remaining portion of the paraffin feed at not in excess of about ambient temperature being parallelly introduced to each reaction zone other than the topmost zone;
   continuously introducing chlorine gas to each of the reaction zones whereby the total amount of chlorine so introduced is such as to provide an overall external molar ratio of chlorine to paraffin of from about 0.15 to 0.40;
   venting generated HCl from each of the reaction zones; and
   continuously removing the chlorinated product from the last of said reaction zones.

2. A continuous method for chlorinating a detergent range n-paraffin or mixture thereof to produce a partially chlorinated product suitable for use in the preparation of detergent alkylates which comprises:
   continuously introducing said paraffin to a vertically disposed cylindrical tower having from 3 to 6 superimposed communicating reaction zones, each of which has a provision for effecting a high liquid holdup whereby from about 40 to 80% of the overall paraffin feed at a temperature between about 230 and 260° F. is introduced into the topmost zone with the remaining portion of the paraffin feed at not in excess of ambient temperature being parallelly introduced at about an equal rate into each of the reaction zones other than the topmost zone;

continuously introducing chlorine gas at about an equal rate to each of the reaction zones whereby the total amount of chlorine so introduced is such as to provide an overall external molar ratio of chlorine to paraffin of from about 0.15 to 0.40.

venting generated HCl from each of the reaction zones; and continuously removing the chlorinated product from the last of said reaction zones.

3. A process in accordance with claim 2 wherein the chlorine is introduced at about an equal rate to each of said reaction zones.

4. A process in accordance with claim 3 wherein the total amount of chlorine introduced to said zones is such as to provide an overall external molar ratio of chlorine to paraffin of from about 0.2 to 0.3.

5. A process in accordance with claim 4 wherein said vertically disposed cylindrical tower has five superimposed communicating reaction zones.

6. A process in accordance with claim 2 wherein the chlorine feeds are introduced into the reaction zones at an entrance tip velocity of between about 100 and 400 feet per second and at a superficial gas velocity of not in excess of about one foot per second.

7. A process in accordance with claim 5 wherein the chlorine feeds are introduced into the reaction zones at an entrance tip velocity of between about 200 and 400 feet per second and a superficial gas velocity of between about 0.1 and 0.3 foot per second.

References Cited

UNITED STATES PATENTS

| 2,081,322 | 5/1937 | Carney | 260—660 |
| 2,916,428 | 12/1959 | Stretton et al. | 260—660 XR |
| 2,916,527 | 12/1959 | Adams et al. | 260—660 |
| 2,997,508 | 8/1961 | Stretton et al. | 260—660 |
| 3,014,959 | 12/1961 | Marti et al. | 260—656 XR |
| 1,432,761 | 10/1922 | Koch | 260—660 |
| 2,147,577 | 2/1939 | Hass et al. | 260—660 |

FOREIGN PATENTS 1,088,030   9/1960   Germany.

LEON ZITVER, *Primary Examiner.*

T. G. DILLAHUNTY, *Assistant Examiner.*

U.S. Cl. X.R.

260—652